June 24, 1930.  E. S. OSTLER  1,767,472

TRANSMISSION DEVICE

Filed June 18, 1926  2 Sheets-Sheet 1

Inventor
Ernest S. Ostler
Jones, Addington, Ames & Seibold
Attys

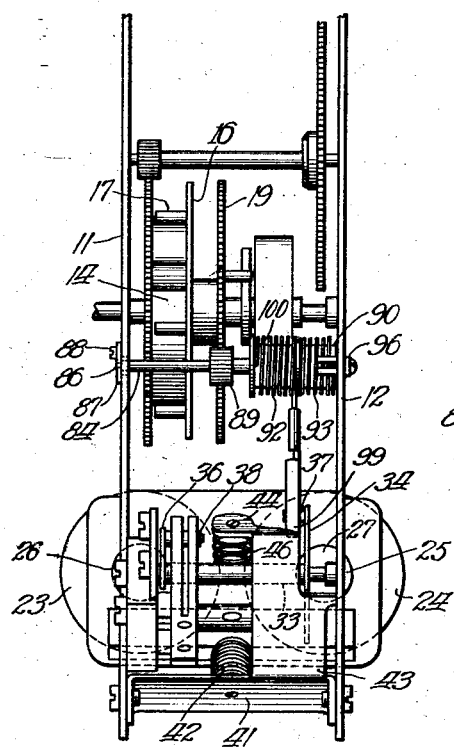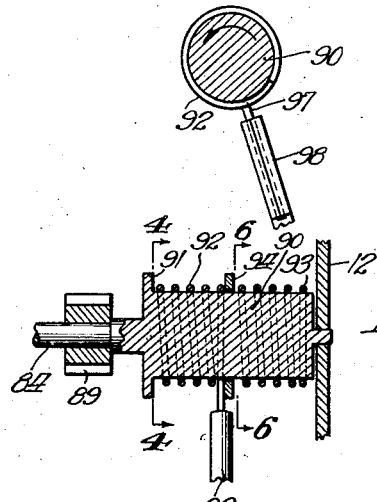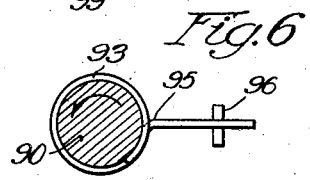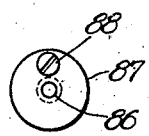

Patented June 24, 1930

1,767,472

UNITED STATES PATENT OFFICE

ERNEST S. OSTLER, OF CHICAGO, ILLINOIS, ASSIGNOR, BY MESNE ASSIGNMENTS, TO STROMBERG ELECTRIC COMPANY, A CORPORATION OF DELAWARE

TRANSMISSION DEVICE

Application filed June 18, 1926. Serial No. 116,843.

My invention relates to a transmission and more particularly to a transmission for operating mechanisms, or the like, in an intermittent or step by step movement.

One of the objects of my invention is to provide a cheap, simple and efficient transmission device by eliminating all gears, pinions, racks, pawls, etc., and one which will still produce a ratchet-like action without the usual back lash inherent in the above mentioned types.

Another object of my invention is to provide a transmission device which may be actuated from the most delicate source of power and which, when operating, will be practically noiseless.

It is well known that where pawls working with a rack or gear wheel are employed for retaining a step by step mechanism in its advanced position during the return of the actuating members, the member actuated will move in a reverse direction until the pawl is properly engaged with a tooth on the rack. In my invention, by the use of helical springs operating on a drum, there will be no back lash or so little that the amount thereof is negligible, so that the full amount of energy expended by the actuating member will be utilized and the actuated parts retained in their advanced positions.

In order to properly illustrate my improved transmission device, I have shown the same and shall hereinafter describe it in connection with what is known as a self-winding or vibratory winding clock.

Advantages and objects other than those above set forth will at once suggest themselves as the design and operation of my improved transmission device becomes better understood by reference to the following description when considered in connection with the accompanying drawings in which:—

Fig. 3 is an end view of the clock looking in the direction of the arrow A in Fig. 1;

Fig. 4 is an enlarged sectional view of the drum taken on line 4—4 of Fig. 5;

Fig. 5 is an enlarged sectional view of the drum showing the actuating and retaining springs in position thereon and taken on the line 5—5 of Fig. 2;

Fig. 6 is an enlarged vertical sectional view of the drum taken on the line 6—6 of Fig. 5;

Fig. 7 is an enlarged view of the bearing supporting one end of the shaft carrying the transmission device.

Like symbols of reference herein indicate like parts in each of the figures of the drawings.

Figure 1:
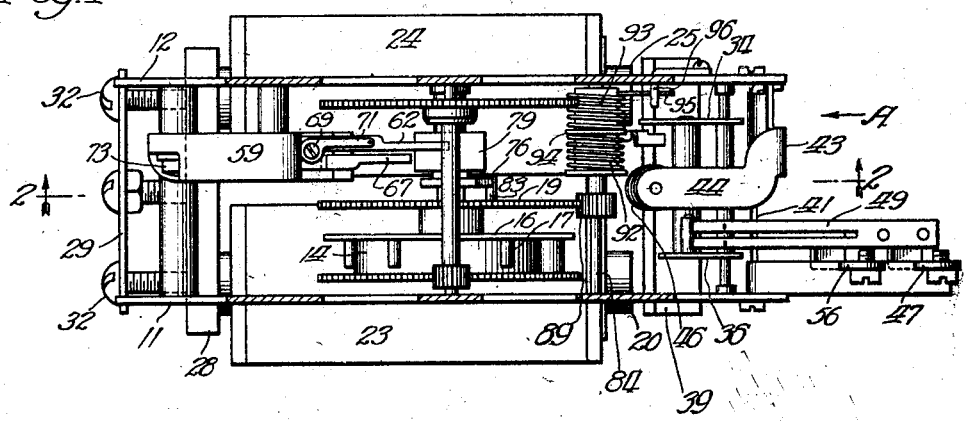
Figure 1 is a top plan view of a self-winding clock having the upper portion broken away and showing my improved transmission device incorporated therein.

My invention is shown and such parts as are necessary for the proper understanding of the operation thereof will be described in connection with the self-winding clock which has the usual front and back movement plates 11 and 12 which are usually stamped from sheet brass and are provided with a series of pillar posts 13 for maintaining the proper distance between the same. The mechanism of the clock proper, which is of the usual type and which is unnecessary to be described, is operated by a spring 14 mounted on the spring barrel plate 16, which has a series of projecting pins 17 for retaining the said spring within the embrace thereof. When the plate 16 is rotated tension will be placed upon the said spring for driving the clock mechanism. The plate 16 is secured to a winding gear 19 through which the said plate 16 is rotated as later described.

The front and rear movement plates 11 and 12 are cut out as at 22 and a pair of magnets 23 and 24 are mounted therein and these magnets have the usual cores 26 and 27 which are connected at the rear end thereof by the bar heel piece 28, so as to provide the usual magnetic poles 20 and 25. A plate 29 rests within recesses 31 in the movement plates and extends between the same and bolts 32, shown in Fig. 1, extending through said plate and into said bar or heel piece 28, hold the said magnets in position while the front ends thereof are suitably supported as at 15.

Figure 2:
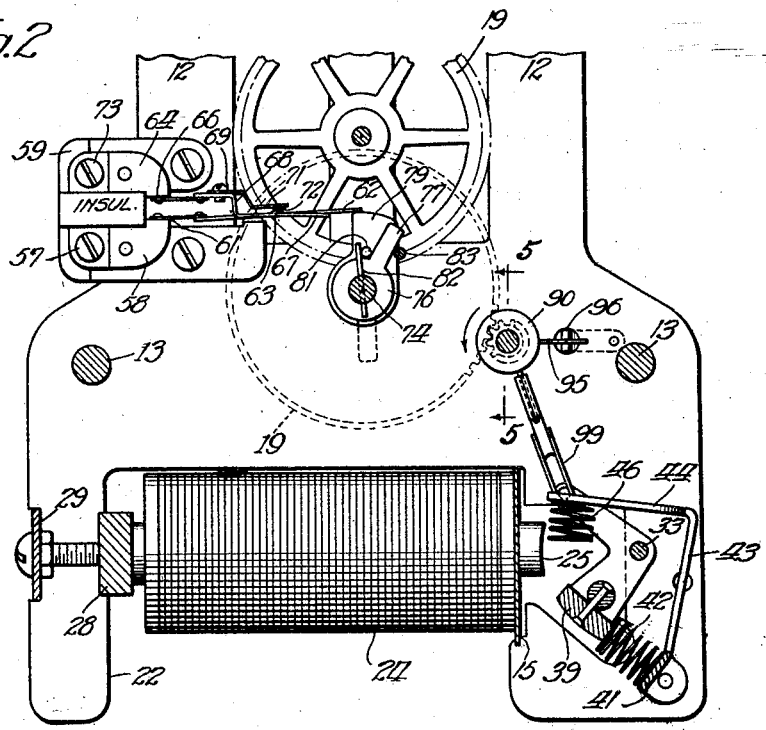
Fig. 2 is a longitudinal sectional view of the same on the line 2—2 of Fig. 1 and looking in the direction of the arrows.

A shaft 33 extends between the movement plates 11 and 12 and is journalled therein and provided with two bell cranks 34 and 36, the former of which has a pin 37 at the upper end thereof while the latter is provided with an insulated circuit breaking pin 38. The lower ends of both of the bell cranks 34 and 36 are securely connected to an armature 39, which normally rests in the position shown in Figs. 2 and 3 and below the poles 20 and 25 of the electromagnet.

Securely fixed between the movement plates 11 and 12 is a bracket pillar 41, which is provided with an angularly disposed spiral spring 42, free at its upper end and against which the armature 39 is adapted to rest when in repose. This pillar 41 has an upwardly extending portion 43 and an overhanging portion 44, which is also provided with a spiral spring 46 extending downward from the underface thereof, having its lower end free and against which the armature 39 is adapted to strike when drawn upward by the magnetic influence of the poles 20 and 25.

An insulating block 46$^a$ is secured to the inner edge of the front movement plate 11 and extends outward therefrom and has a binding post 47 with an inturned lower end 48 to which is secured a split spring contact arm 49, having contact members at a point near the inner end of the same. These contact members are adapted to engage a contact on a rigid arm extending inward from the inturned portion of the binding post 56 and a lead (not shown) extends from the binding post 56 to a battery or other suitable source of electric current and then to the binding post 57 on the plate 58 of the insulating block 59 secured to the inside face of the rear movement plate 12.

The plate 58 has an overturned portion 61 which carries the inwardly projecting contact finger 62, which has a contact member 63 located thereon. Immediately above the plate 58 is a plate 64, which has a downwardly and inwardly inclined portion 66 carrying thereon a spring contact finger 67 which has an ogee curved portion 68 therein which causes the outer end of the said finger 67 to normally rest in substantially the same horizontal plane as the finger 62 and on the upper part of the finger 67 a contact finger 69 is secured and said finger has a downwardly extending portion 71 carrying a contact member 72, which is adapted at certain periods, as hereinafter explained, to contact with the member 63 in order to complete the electric circuit which energizes the magnets 20 and 25. The binding post 47 on the insulating block 46$^a$ and the binding post 73 on the insulating block 59 are connected to a source of electric current by any suitable means (not shown). Loosely rotatable on the shaft 73 is a dog 76 which has a finger 77, which dog may be formed of a thin sheet of metal, while immediately beyond the said dog 76 is a cam 79 which is formed of bakelite, or other suitable insulating material, and adapted at suitable times to complete the contact between the members 63 and 72 on the fingers 62 and 67 as later explained. The cam 79 is provided with a pin 81 which extends into the plane of operation of the finger 77 on the dog 76, while the shaft 74 is provided with a pin 82 extending through the same and having one of its ends sufficiently long to engage the pin 81 on the cam 79 at the necessary and required intervals. The inner face of the winding gear 19 is also provided with a pin 83 for operating the finger 77 on the dog 76 as in the usual self-winding clock construction.

A shaft 84 has its outer end journalled in the rear movement plate 12, while the front end thereof extends through a hole 86 in the front movement plate 11 and into the bearing plate 87 secured to said frame by the set screw 88. This shaft 84 is provided with a pinion 89 which meshes at all times with the winding gear 19 so that when the same is turned, it operates the said gear 19, and consequently the plate 16 carrying the spring 14, and thus winds the said spring so as to give the same sufficient tension for operating the usual clock parts. Beyond the pinion 89 is drum 90 which has a flange 91 extending around the inner end of the same and this drum has two helical springs 92 and 93 divided by a washer 94, said springs being in no way connected together. The rear supporting frame 12 performs for the outer end of the spring 93 the same function as the flange 91 on the other end of said drum so that said spring is held in position on said drum. An outturned portion 95, being the end of the outer convolution of said spring 93, rests between the arms of a forked member 96 so as to prevent its rotation and the inner convolution is free and disconnected so that if the drum would attempt to turn clockwise the helices on said spring would grip said drum and prevent such rotation. The spring 92 has its outer convolution bent outward as at 97 and such bent out portion fits into a sleeve 98 where it is soldered or securely fixed by any suitable means and this sleeve terminates in a pair of guide rails 99 between which the pin 37 on the outer end of the bell crank 34 is adapted to operate. The inner end of the spring 92 is also unconnected and said spring turns freely on the face of the drum when operating in a direction contrary to the direction of the arrow shown in Fig. 6.

The operation of my improved transmission device can very readily be understood in its application to the self-winding clock shown in the drawings, but it will be understood that this is only one adaptation and the device may be incorporated in any mechanism where a step by step movement is desired.

Let us consider that the cam 79 has engaged the outer end of the contact finger 62. In this position the contact finger 67, having been disengaged, will have dropped to substantially the same horizontal plane as the contact finger 62 and the contact member 63 thereon will be engaged by the contact member 72 on the extension 68 so as to form a closed electric circuit, as the contact 51 is normally in engagement with the contact on the arm 53 and the binding post 73 on the insulating block 59 and the binding post 47 on the insulating block 46$^a$ are connected with a source of electric current. The current will pass through the winding of the magnets and energize the poles 20 and 25, so that the armature 39 on the bell crank 34 will be drawn around and upward toward the pole faces on the axis of the shaft 33. When the armature has reached its uppermost position it will strike against the spring 46, while the insulated pin 38 will engage the contact arm 49 and disengage the contacts 51 and 52 so as to break the circuit, whereupon the armature will drop rapidly with the assistance of the spring 46 and will strike against the spring 42 and the electric circuit having been again completed, the armature will immediately be drawn upward on the axis of the shaft 33 and continue to repeat the operation just described. As the armature rises the pin 37 on the bell crank 34 riding between the guide rails 99 will draw the same outward so as to rotate the spring 92 on the drum 90. This spring is about one-half to one one-thousandth of an inch smaller in diameter than the diameter of the drum and when the member 99 is rotated, its convolutions will immediately grip the drum and turn the same, and consequently, will turn the winding gear 19 through the medium of the pinion 89 operating on the same shaft. When the armature is lowered, the spring 92 is free to rotate in a reverse direction while the spring 93, having the extension 95 of its outer convolution held by the forked member 96, will by its convolutions grip and prevent the drum 90 from rotating in a reverse direction and thus the drum will continue to rotate in the direction of the arrow shown in Fig. 8, as long as the armature is raised by the magnetic influence, so as to turn the winding gear 19 and thus keep the clock wound up. After the winding gear 19 has been given one complete revolution the pin 82 will have carried the finger 77 of the dog 76 upward until it strikes against the pin 81 on the cam 79 and thus said cam will be pressed from under the contact finger 62 thereby breaking the contact between the members 72 and 63 so as to break the electric circuit for energizing the magnets.

It has been found in actual practice that the armature 39 operating between the springs 42 and 46, which tend to liven the action thereof, will take about eight to twelve seconds to turn the winding gear 19 one complete revolution and this action produces enough tension on the spring 14 to operate the clock for another hour at which time the parts are again brought into the position just described with the cam 79 resting beneath the contact finger 62, so as to complete the electric circuit used for energizing the magnets. It will be noticed that the springs 92 and 93 are wound in the same direction and operate against one another so that when the portion 97 of the spring 92 is rotating the drum 90 the spring 93 will be sliding loosely thereon, but when the spring 92 slides back loosely on the drum the convolutions of the spring 93 will tighten and prevent the reverse movement of the drum 90 due to the springs being of slightly less diameter than the drum.

The transmission device mounted on the shaft 33 can be readily removed for repair or substitution by unscrewing the set screw 88 and removing the bearing plate 87 when the outer end of the shaft may be drawn from the rear movement plate and as the hole 86 in the front plate is made sufficiently large the guide rails 99 may be disengaged from the pin 37 and the entire movement turned slightly and withdrawn.

While I have shown my invention in connection with the self-winding clock to which the same has been applied and has proven itself practical and efficient, I do not limit myself to such use or any particular use of the device, as it will be apparent to any one skilled in this art that the transmission device may be incorporated in many different mechanisms other than the one described herein. It will also be understood that the details of construction are capable of wide modification and variation without departing from the spirit of the invention or sacrificing any of its advantages. Hence, I reserve all such variations, modifications and mechanical equivalents as fall within the spirit and purview of the appended claim.

I claim:

A transmission comprising a cylindrical drum, an actuating coil spring surrounding one portion of said drum, a holding coil spring surrounding another portion of said drum, the inside diameters of said coil springs being slightly less than the diameters of those portions of the drum which they respectively surround when the springs are untensioned, said coil springs being wound in the same direction on said drum, means for oscillating one end of the actuating spring whereby it grips in one direction and slips in the other to intermittently actuate the drum, and means for holding one end of the holding spring to cause said holding spring to grip when the actuating spring slips to prevent reverse rotation of the drum and to cause said holding spring to slip when the actuating spring grips to permit of forward rotation of the drum.

In witness whereof, I have hereunto subscribed my name.

ERNEST S. OSTLER.